No. 645,367. Patented Mar. 13, 1900.
F. M. MARNEY.
TIRE TIGHTENER.
(Application filed Jan. 31, 1900.)

(No Model.)

Inventor
Frank M. Marney

Witnesses

Attorneys

UNITED STATES PATENT OFFICE.

FRANK M. MARNEY, OF VINCENNES, INDIANA.

TIRE-TIGHTENER.

SPECIFICATION forming part of Letters Patent No. 645,367, dated March 13, 1900.

Application filed January 31, 1900. Serial No. 3,472. (No model.)

*To all whom it may concern:*

Be it known that I, FRANK M. MARNEY, a citizen of the United States, residing at Vincennes, in the county of Knox and State of Indiana, have invented certain new and useful Improvements in Tire-Tighteners; and I do declare the following to be a full, clear, and exact description of the invention, such as will enable others skilled in the art to which it appertains to make and use the same.

The invention has relation to tire-tighteners.

The object of the invention is to provide a tire-tightener which shall be simple of construction, durable in use, and comparatively inexpensive of production, and which shall be automatic in action and compensate for expansion and contraction of the tire and for the shrinkage and the swelling of the felly.

To this end the invention consists in certain features of construction and combination of parts, which will be hereinafter fully described and claimed.

Figure 1:
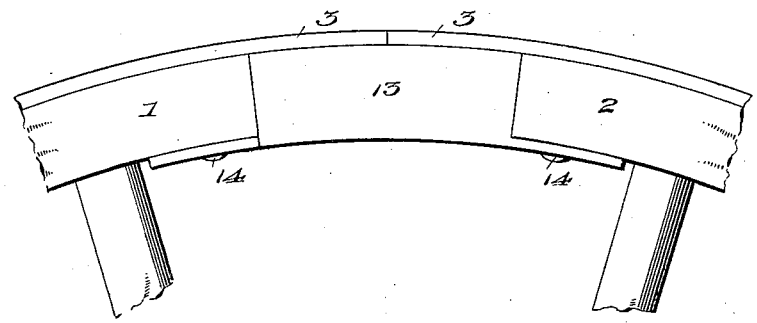
Figure 3:
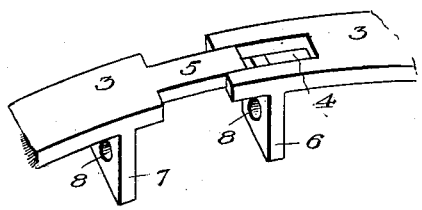
Figure 4:
Figure 2:
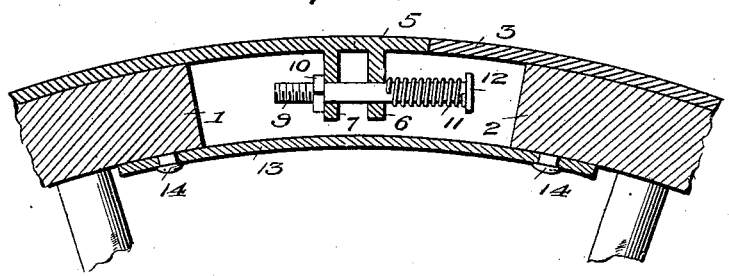

In the accompanying drawings, Figure 1 is a side elevation of a portion of a wheel embodying my invention. Fig. 2 is a longitudinal sectional view through the same. Fig. 3 is a detail perspective view of the adjacent ends of the tire, showing them separated. Fig. 4 is a top plan view of the same.

In the drawings the same reference characters indicate the same parts of the invention.

1 and 2 denote the adjacent ends of the felly, which are spaced apart, as shown.

3 denotes the tire, one end of which is provided with a recess or notch 4 and the other end with a coacting tongue 5. To the under side of the tire, near its ends, are secured by rivets or welding thereto angular plates 6 and 7, provided with alined holes 8. 9 denotes a bolt which extends through the holes of the said plates and is provided with an adjusting-nut 10.

11 denotes a stiff coil-spring placed upon the bolt between its head 12 and the angular plate 6 and exerts its energy to draw the angular plates together.

13 denotes a removable box or clip connected by a bolt 14 to one of the angular plates and designed to conceal and protect the tightener.

It is of course understood that the spring will be of sufficient strength to tightly hold the tire around the felly. In the contraction of the tire due to sudden changes in the temperature the spring will give to compensate for such contraction, and thereby prevent the "dishing" of the wheel. Should the tire expand, the spring will draw its ends closer together to compensate for such expansion. The spring also serves to compensate for the shrinkage or swelling of the felly.

From the foregoing description, taken in connection with the accompanying drawings, the construction, operation, and advantages of my improved tire-tightener will be readily apparent without requiring an extended explanation.

It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

The combination with a felly the ends of which are spaced apart; of a tire the ends of which have a sliding engagement with each other, angular plates secured to the ends of said tire and having their ends projecting downward between the spaced-apart ends and formed with alined apertures, a bolt extending through said apertures and provided with an adjusting-nut, and a coil-spring placed upon said bolt and confined between its head and one of the downturned ends of the angular plates, substantially as and for the purpose set forth.

In testimony whereof I have hereunto set my hand in presence of two subscribing witnesses.

FRANK M. MARNEY.

Witnesses:
BENJAMIN F. WHEELER,
GEO. G. MORRIS.